United States Patent
Birk et al.

(10) Patent No.: US 6,386,981 B1
(45) Date of Patent: May 14, 2002

(54) COMPONENT FOR CONNECTION TO A CRANKSHAFT AND METHOD FOR ITS MANUFACTURE

(75) Inventors: Albert Birk, Bühl-Vimbuch; Wilfried Schwenk, Achern-Mösbach; Reinhold Oser, Achern-Wagshurst, all of (DE)

(73) Assignee: LuK Lamellen und Kupplungsbau GmbH, Buhl/Baden (DE)

( * ) Notice: Subject to any disclaimer, the term of this patent is extended or adjusted under 35 U.S.C. 154(b) by 0 days.

(21) Appl. No.: 09/433,728

(22) Filed: Nov. 4, 1999

(30) Foreign Application Priority Data

Nov. 5, 1998 (DE) .......................... 198 50 976

(51) Int. Cl.⁷ ................................ F16D 3/12
(52) U.S. Cl. .................... 464/68; 192/109 R
(58) Field of Search ................ 464/68; 192/208, 192/212, 70.17, 109 R; 74/573 F, 572, 574

(56) References Cited

U.S. PATENT DOCUMENTS

| | | | | | |
|---|---|---|---|---|---|
| 5,367,920 | A | * | 11/1994 | Bonfilio | 74/574 |
| 5,551,318 | A | * | 9/1996 | Fukushima | 74/574 |
| 5,669,478 | A | * | 9/1997 | Schierling et al. | 74/574 |
| 5,816,973 | A | * | 10/1998 | Sudau et al. | 475/347 |
| 5,819,598 | A | * | 10/1998 | Cooke et al. | 74/574 |
| 5,826,689 | A | * | 10/1998 | Bochot | 192/70.17 |
| 5,967,899 | A | * | 10/1999 | Schierling | 464/24 |
| 6,003,650 | A | * | 12/1999 | Kleifges | 192/70.17 |
| 6,058,801 | A | * | 5/2000 | Schierling et al. | 74/573 |
| 6,119,839 | A | * | 9/2000 | Jackel et al. | 192/55.1 |
| 6,167,999 | B1 | * | 1/2001 | Reik et al. | 192/55.1 |
| 6,186,898 | B1 | * | 2/2001 | Lopez | 464/68 |

* cited by examiner

Primary Examiner—Lynne H. Browne
Assistant Examiner—Kenn Thompson
(74) Attorney, Agent, or Firm—Darby & Darby (57) ABSTRACT

The invention relates to a one-piece component 1 with an at least partial axial contact bearing face 3 for the centred mounting of a ring-shaped component. The one-piece component is made by means of a cross flow pressing process.

30 Claims, 4 Drawing Sheets

COMPONENT FOR CONNECTION TO A CRANKSHAFT AND METHOD FOR ITS MANUFACTURE

The invention relates to a one-piece component as well as to a method for its manufacture, more particularly for fixing on a crankshaft of an internal combustion engine wherein the component has at least one axially formed mounting for a ring-shaped component which is to be attached centred at a later time, the component is made by means of a cold forming process and the component has in the area of the mounting surface a radially formed stop shoulder.

Components of this kind are described many times in prior art and normally represent a flywheel mass which is fixed on the crankshaft, with an axial seat onto which a starter ring gear is drawn, with a radially aligned stop shoulder. To ensure centring of the starter ring gear the centred mounting is formed by removing some stock material. This leads to an increase in the manufacturing costs and production times since the component has to be mounted in various machines and processed.

The object of the invention is therefore to provide a cost-effective and correspondingly simple to manufacture component as well as a manufacturing method suitable for this where the component is made without stock removal.

This is achieved in that a one-piece component is made by means of a cold forming process with an axially oriented mounting surface for subsequent attachment and centring in position of a ring-shaped component, and a radially oriented shoulder formed from a material accumulation formed radially outside during forming of the axially oriented mounting surface.

The axial mounting surface can be formed by at least one and preferably several circumferentially spaced circular recesses or circumferentially through the formation of a ring-shaped mounting surface. Consequently the radially designed stop shoulder can also be made from individual material thickenings or accumulations in the radial direction spread out over the circumference or can form a substantially circumferential stop. At certain angular regions of the shoulder circumference which are subject to additional imprinting steps before or after the method of the invention, the formation of the stop shoulders can be omitted through a lack of material. Preferably a starter ring gear and/or ignition marker ring is drawn onto the resulting contact bearing surface and this ring can then be welded, caulked and/or shrink-fitted thereon.

It can equally be advantageous to provide corresponding contact bearing surfaces in addition or as an alternative for mounting a flywheel mass or a bearing, such as for example a rolling or sliding bearing, for mounting a flywheel mass on the component. It can also be advantageous to provide a contact bearing surface for the centred fitting of the crankshaft.

To fix the ring-shaped component on the contact bearing face so that it is secure against tilting it can be advantageous to make the axial dimension of the mounting surface at least half the axial dimension of the ring-shaped component which can be attached so that it can be possible to fix the ring-shaped component by press-fit onto the contact bearing face of the one-piece component without further connection measures such as for example welding.

Further advantageous developments of the one-piece component can be for example a flywheel to be fixed on the crankshaft or an axially elastic and circumferentially rigid drive plate as well as a flywheel disc part of a divided flywheel.

Thus for example the one-piece component can be a primary part with a flywheel mass and this primary part can be rotated relatively against at least one secondary part which can be connected for engagement and disengagement with a gear input shaft having a flywheel mass, against the action of a damping device acting at least in the circumferential direction in the force flow between the primary and secondary part. In an advantageous development the one-piece component then forms the complete primary flywheel disc part of the divided flywheel or in a further advantageous embodiment only the bearing flange which is connected to the crankshaft through the centred bearing face. The primary flywheel disc part can then be connected to the bearing flange by means of rivets for simple assembly and to reduce the number of rivets.

Axially formed nipples can be imprinted by the cold forming technique in one of the two parts which are to be riveted and the nipples can engage in corresponding openings in the other part and be riveted at their end sides to the edges of the openings. Through the high forces which occur during the riveting process it may happen that the centring of the bearing flange provided in the bearing flange for mounting on the crankshaft becomes impaired, for example compressed.

It is therefore advantageous to provide the openings in the bearing flange and the nipples in the flywheel disc part and to design the openings so that at least three noses are formed evenly spread out over the inner circumference of the openings and aligned radially inwards with the nipples provided in the primary flywheel disc being riveted to the noses. Advantageously the alignment of the noses is such that none of the noses is mounted on an imaginary line between each centre of the openings and the axis of rotation of the bearing flange so that in this area of the centring of the contact bearing face lying closest no compression forces appear with the material flow in the direction of the centring during riveting and thus the centring can be properly maintained.

A further advantageous embodiment of the one-piece component has, when used in a divided flywheel, the provision of a transport retaining lock wherein the primary flywheel disc part is fixed secured against rotation relative to the secondary flywheel disc part during transport or assembly.

Advantageously the transport retaining lock is placed radially between circumferentially arranged energy accumulators belonging to the damping device, and a mounting of the primary flywheel disc part on the crankshaft. Advantageously the transport retaining lock can consist of a plastics part which is snap-fitted in correspondingly recessed window-shaped openings in the primary and secondary flywheel disc parts and has a designed in break point axially between the primary and secondary flywheel disc parts.

The openings are in particular punched out in the one-piece component according to the invention which functions as a primary disc part.

Furthermore it can be advantageous to snap-fit the transport retaining lock in the form of the plastics part into a corresponding opening of a radially aligned flange part connected rotationally secured to the secondary flywheel part for biasing the energy accumulators on the secondary side and into the primary flywheel disc part. The transport retaining lock is advantageously dimensioned so that it separates completely with the initial start-up of the internal combustion engine.

In a divided flywheel having the one-piece component according to the invention this can be formed as a primary flywheel disc part so that at least one radially inwardly open chamber adapted in the circumferential direction to the extent of the energy accumulators is formed on the outer circumference out of the primary disc part and/or in connection with at least one component connected thereto. The flange part connected rotationally secured to the secondary flywheel disc part engages from radially inside through the chamber for biasing the energy accumulators with the energy accumulators housed in the chamber and the chamber being filled at least in part with lubricant for lubricating the energy accumulators.

Furthermore it can be advantageous to provide, radially inside the inner circumference of the chamber, punched-out assembly and/or ventilation bores spread out around the circumference and having a raised punched aperture whereby lubricant which may be warmed up and which during stationary periods of the crankshaft is forced radially inwards is supplied back along the profiled aperture through centrifugal force into the chamber during subsequent rotation of the crankshaft and does not pass radially inwards onto the friction device which is provided radially outside of the bearing which mounts the two flywheel disc parts on one another.

A further advantageous development of the one-piece component for use as a primary flywheel disc part can be the stamping of the primary disc part to a centring diameter on which a ring-shaped component such as for example the ignition marking ring, can be centred and mounted, and in a simplified method of assembly can be connected for example welded to the primary flywheel disc part or a component connected thereto, such as for example the flange forming the chamber. It can also be advantageous here to make the punched aperture of the centring diameter raised in order to obtain radial play for any welded seams which may be provided between the primary disc part and a radial flange part, by way of example for forming the chamber.

More advantageously an ignition marking ring which is to be fitted round the outer circumference of the primary flywheel part is likewise made by cold forming technology and is punched out from a round plate. In order to obtain internal stability and additional mass the ring can be folded at least once in the radial direction and may have on the outer circumference an axially aligned ring face in which the ignition markings are provided in the form of a chamber or window structure.

The one-piece component described in various forms above can be made by the advantageous method described below for manufacturing the one piece component without stock removal wherein the method is divided up into at least the following method steps:

1. A three-dimensional preform having at least one axial ring face is made from an approximately planar plate of cold deformable material such as steel by the cold forming process;
2. The preform is centred, for which the preform is correspondingly prepared, by way of example centring cams and the like can be imprinted therein onto which the blank shape is mounted;
3. In a method step at least one axial contact bearing face is formed on the axial ring face for centring a ring-shaped component which is to be attached at a later time, and from the material which is displaced in the axial direction as the contact bearing face is formed, a radially designed stop shoulder is formed by a cross flow process.
4. A tool required for the process can be designed so that the contact bearing face is shaped circumferentially or partially spread over the circumference, by way of example in the form of three contact bearing faces spread out over the circumference. It follows from this that the stop shoulder is correspondingly shaped out, namely either circumferentially or in the form of stop cams spread out over the circumference.
5. In a following method step apertures can be punched out and/or studs, by way of example axially formed nipples, are imprinted for forming the rivet connections with a component which is to be attached.

A further advantageous development of the method is a method step wherein holes are punched out which have a raised punched aperture. Holes or openings of this kind can serve for example for ventilation or as assembly access whereby the raised punched aperture can have advantages, as already described. Furthermore it can be advantageous to punch out the entire one-piece component centred and also here to provide a raised punched aperture in order to fit a further component on the centred diameter and to create a gap through the raised punched aperture radially between the additional component and the one-piece component which can be occupied for example by a welded seam with which the one-piece component is connected to a further axially adjoining component.

A further advantageous embodiment allows the one piece component to undergo following the process according to the invention a hardening process whereby hardened parts such as for example the bearing flange can be made without stock removal and without additional calibrating processes.

The invention will now be explained in further detail with reference to the drawings in which.

BRIEF DESCRIPTION OF THE DRAWINGS

FIGS. 1a to f show the manufacture of a one-piece component according to the invention in various manufacturing stages, using the example of a primary flywheel disc part 1. The method steps are carried out in a high pressure press using tools which will be described below. As can be seen from FIG. 1a a sheet metal blank 1a is punched out from a strip or circular blank of material to have a predetermined diameter and central opening 2.

Figures 1A, 1B, 1C:
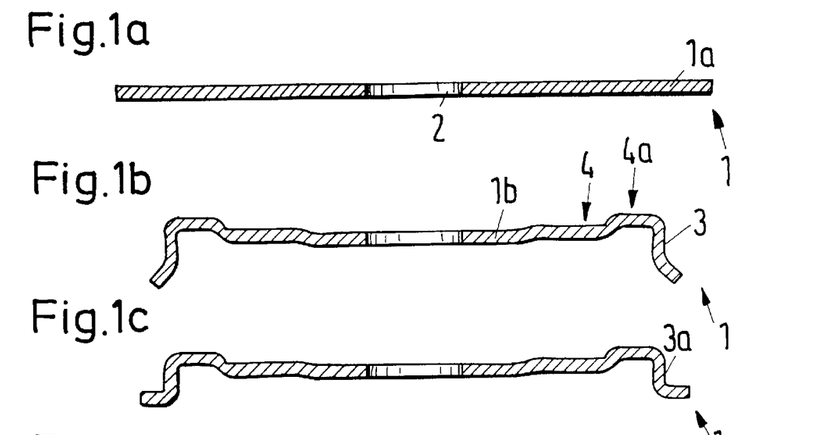
FIGS. 1a–f show the steps for manufacturing an embodiment of a one-piece component according to the invention.

The second step—shown in FIG. 1b—is a drawing process in which the blank 1b is drawn axially around the outer circumference to form a pot-shaped but still not completely axially aligned ring surface 3. Furthermore the axial profiled section 4 is shown with an axial bulge 4a for subsequently mounting the energy accumulators of the damping device.

The following step illustrated in FIG. 1c is a compression step in which the axial ring surface 3a has already been substantially prepared but is not yet centred and the diameter is still not calibrated. In manufacturing processes which are already known the blank part is removed from the press after this method step or at the end of the pressing process and the contact bearing surface is then applied with the necessary centring and calibrated diameter by means of a stock-removing manufacturing process, for example on a lathe.

Figures 1D, 1E, 1F:
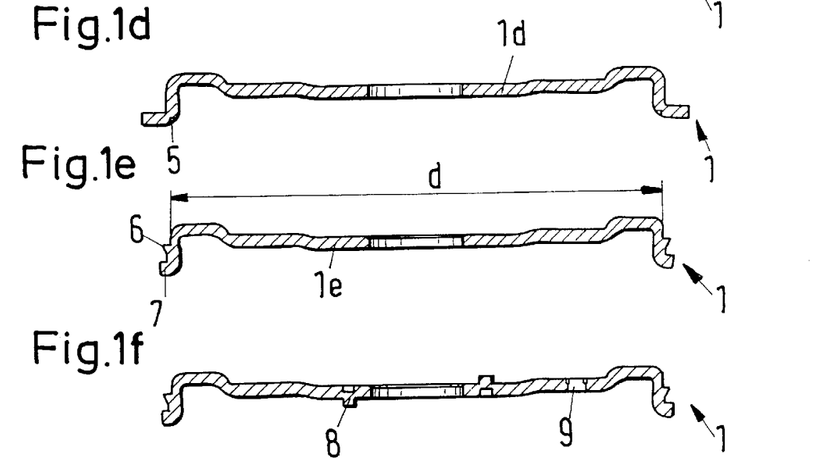

In the proposed method the blank part 1d is centred; for example indented centring cams 5 can be distributed around the circumference of the blank part 1d and the blank part 1d can be mounted on these.

In a following step—shown in FIG. 1e—a pressing process is carried out in the axial direction by a ram which stamps precisely the centring diameter for the ring-shaped component part, which is to be later fitted and centred, and thereby produces the contact bearing face 6. A die, designed as an abutment on the side of the blank part 1e opposite the ram, blocks the axial material flow so that in the cross flow direction to the imprinting direction the radial shoulder 6 is formed. A further die can be integrated from radially outside into the pressing tool for shaping the shoulder 6. In the same or in a following processing step the outer circumference 7 of the blank part 1e can be stamped on a centring diameter for a further ring-shaped component which is to be mounted later on, by way of example an ignition marking ring so that after centring this can be connected, for example welded, to the one-piece component or a component connected thereto.

FIG. 1f shows the fine-finishing step in which for example nipples 8 are imprinted axially on alternate sides and further openings 9 are punched out, by way of example with raised punched aperture.

Figure 2A:
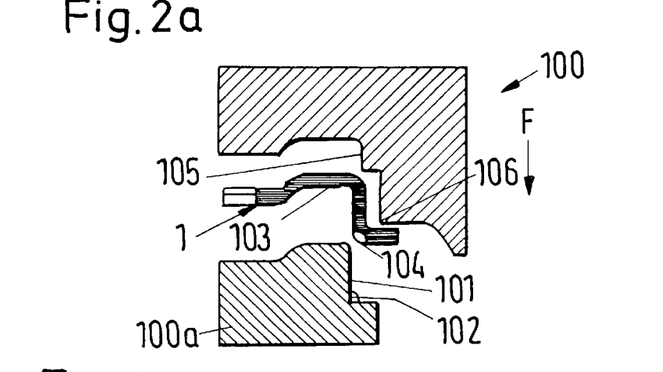
FIGS. 2a and 2b show a schematic sketch of the tool for manufacturing the one-piece component.

FIG. 2a shows a schematic sketch of a tool 100 for manufacturing a one-piece component in the form of a primary flywheel mass 1—here shown as a partial section. The die 100a which is shaped out axially corresponding to the contour 103 of the flywheel disc part 1 receives the flywheel mass 1 with its inner diameter 101 on centring cams 102 which correspond to the centring members 104.

The ram 100b is pressed onto the die 100a with the pressing force F with the interposition of the one-piece component 1. The ram 100b has in the region of the part of the component 1 which is not to be worked an axial contour corresponding to same. Level with the centring diameter the ram 100b is provided with an axially aligned imprinting edge 105 which with regard to its diameter is smaller than the radial extension of the component 1 so that a corresponding removal of material is required at the centring diameter which is to be produced. The outer diameter of the component 1 is punched out in one work step with a ram 106 which is connected to the ram 100b whereby a centred outer diameter of the component 1 is likewise achieved.

Figure 2B:
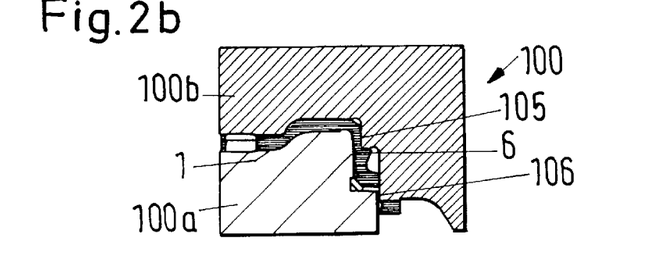

FIG. 2b shows the tool 100 at the end of the pressing process. The ram 100b and die 100a each adjoin the component 1 from the side. The imprinting edge 105 has with an axial counter-hold of the die 100a indented the centring diameter and thereby causes a material thickening 6, which forms the axial shoulder 6, through a cross flow relative to the direction of movement of the ram 100b. The stamping ring 106 has stamped the outer diameter of the component 1.

Figure 3:
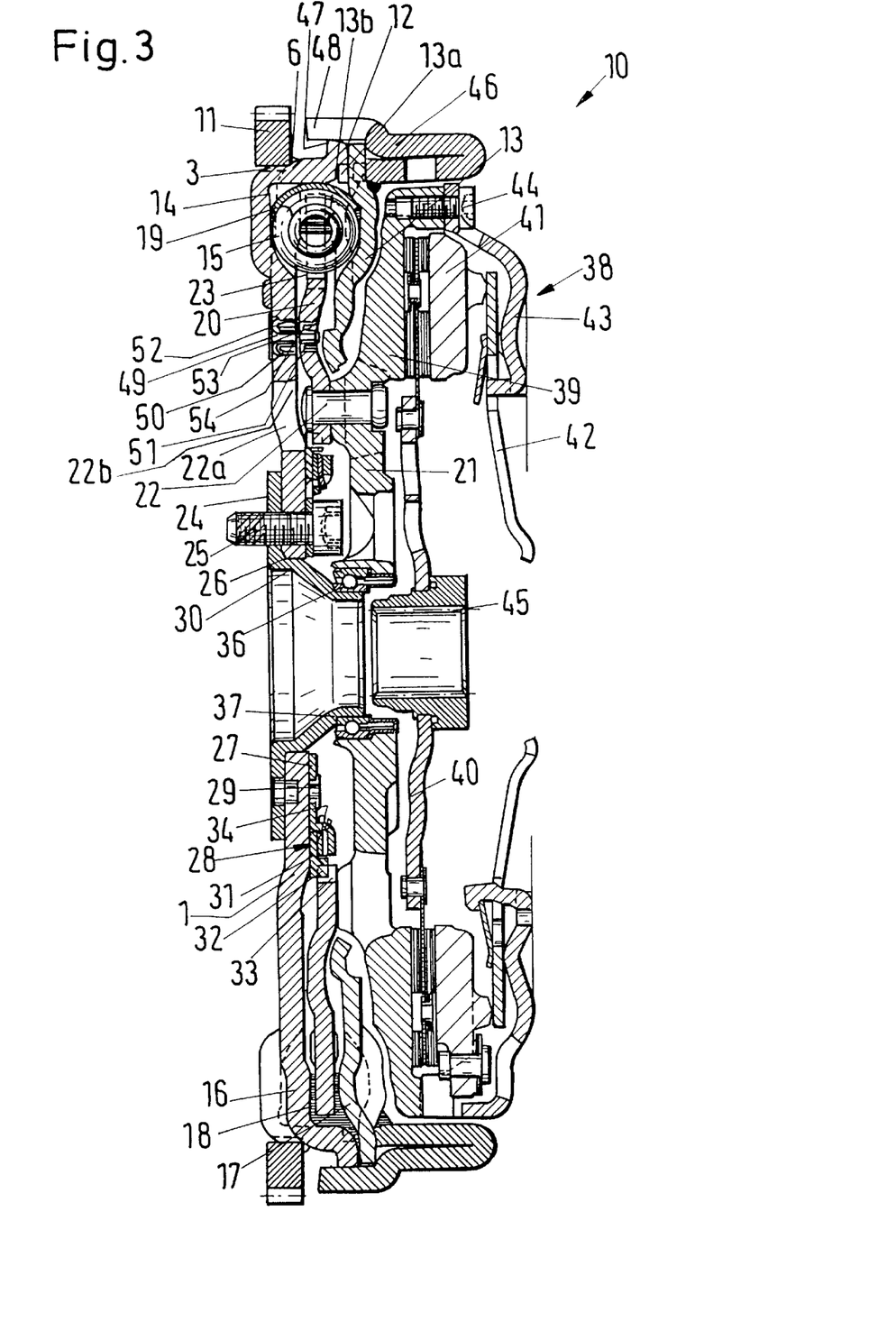
FIG. 3 shows an embodiment of a divided flywheel using the one-piece component according to the invention.

FIG. 3 shows the component 1 according to the invention as a primary flywheel disc part in a divided flywheel 10 with the axial contact bearing face 3 on which the starter ring gear 11 is fitted rotationally secured by means of a pressed seat and is set against the radially outwardly aligned stop shoulder 6.

The primary flywheel disc part 1 is designed pot-shaped and is connected by a welded seam 12 to a ring disc part 13 which has circumferentially imprinted cams 13a for bearing the primary flywheel disc part 1 which is provided with corresponding shaped areas 13b, whereby radially inwardly open chambers 14 are formed which are adapted circumferentially to the length of the energy accumulators 15 which are preferably formed from arcuate springs which extend practically semi-circularly over the circumference, whereby in the illustrated embodiment two chambers 14 are formed with a practically semi-circular extension. To bias the energy accumulators 15 on the primary side shaped areas 16, 17 are provided in the flywheel disc part 1 and in the ring disc part 13 whereby when using two arcuate springs 15 two shaped areas 16, 17 arranged at an angular spacing of approximately 180° each bias one arcuate spring 15 on one side. The chamber 14 is filled at least in part with a lubricant 18 and a wear protection dish 19 is interposed between the inside wall of the chamber and the outer circumference of the energy accumulators 15.

The biasing of the energy accumulators 15 on the secondary side takes place through a ring-disc shaped flange 20 which extends axially between the primary flywheel disc part 1 and the chamber wall 13 radially into the chamber 14 and which is connected to the secondary flywheel disc part 21, preferably riveted by means of the rivets 22. In order to assemble the rivets 22 apertures 22a are provided at the same radial height in the primary flywheel disc 1 and these have a raised punched aperture 22b at which lubricant 18 which may liquefy as a result of great heat collects whilst the divided flywheel 10 is stationary and during subsequent acceleration of the flywheel 10 is transported again radially outwards through the effect of centrifugal force.

For biasing the energy accumulators 15 during relative rotation of the primary flywheel disc part 1 against the secondary flywheel disc part 21 radially aligned extension arms 23 are provided on the outer circumference of the ring-disc shaped flange 20.

Figure 4A:
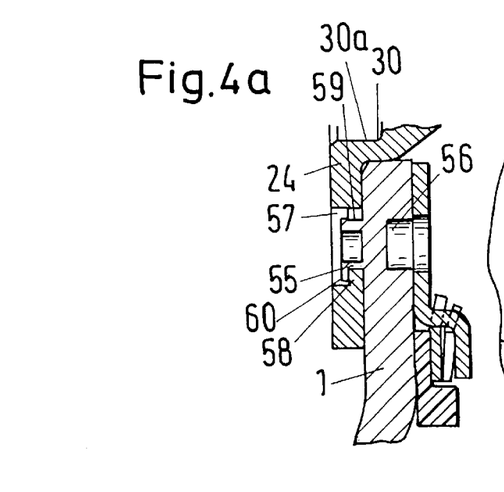
FIGS. 4a and b show a method of connecting the component part according to the invention to a further component.
Figure 4B:
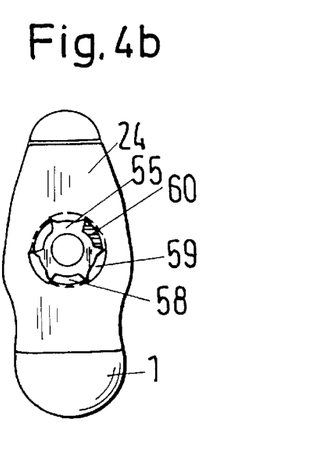

The primary disc part 1 is fitted a round its inner circumference on a hardened bearing flange 24 and is centred on the shoulder 26 whereby prior to the hardening process the shoulder 26 can be attached after an imprinting process according to the inventive method and the bearing flange 24 is fixed to the primary flywheel disc part 1 prior to fitting on the crankshaft by means of rivets which alternate with screws 25 in the circumferential direction—which is not shown here but is illustrated in FIGS. 4a and 4b and will be described in detail later on. The bearing flange 25, the primary flywheel disc part 1 as well as a ring disc shaped flange 27 for the friction device 28 are screwed by means of the screws 28 to the crankshaft (not shown) wherein the ring disc shaped flange 27 is riveted before to the primary flywheel disc part 1 by means of nipples 29 which protrude axially on the primary disc and alternate circumferentially with the screws 25, and the primary part consisting of the bearing flange 24 and primary flywheel disc 1 are centred on the crankshaft by means of the axially indented shoulder 30.

The friction device 28 is housed axially between the ring disc shaped flange 27 and the primary flywheel disc part 1. The friction control disc 31 engages with an outer profiled section 32, preferably outer teeth, in the correspondingly shaped inner profiled section 33 of the flange 20 on the secondary side. The friction engagement of the friction control disc 31 on the friction disc 34 is fixed axially through an axially operating energy accumulator, preferably the plate spring 35.

The secondary flywheel disc part 21 is mounted relative against the primary flywheel disc part 1 on the bearing flange 24 radially inside the circumferentially distributed screws 25 by means of the rolling bearing 36 whereby the imprinted shoulder 37 serves as the axial stop and the maximum turning angle of the two flywheel disc parts 1, 21 is provided when the energy accumulators 15 become blocked.

Radially outside of the rivets 22 the clutch 38 with pressure plate 39, clutch disc 40, contact pressure plate 41, plate spring 42 and clutch cover 43 are provided in known way on the secondary flywheel disc part 21 whereby the clutch cover is fixed by screws 44 on the outer circumference of the pressure plate 39 and the clutch disc 40 directs the force flow to a gear input shaft (not shown) by means of an internal profiled section 45.

The outer circumference of the pressure plate 39 of the secondary flywheel disc part 21 is adjoined directly by the ignition marking ring 46, is folded in the radial direction to increase the primary flywheel mass and is set on the centred circumference 47 of the primary flywheel disc part 1 and is butt-welded to the flange part 13 by its end side which has been folded round. The ignition markings 48 are punched out in comb structure from the ignition marking ring 46 and extend axially in the direction of the starter ring gear 11. The manufacture and construction of the ignition marking ring are explained in more detail with reference to FIGS. 5*a–e*.

In order to fix the rotation of the two flywheel mass parts 1, 21 relative to each other during transport and assembly an anti-rotation lock or transport retaining lock 49 is provided which is preferably formed from an injection moulded plastics part and is snap-fitted into corresponding openings 50, 51 in the primary flywheel disc part 1 and the flange part 13 belonging to the secondary flywheel disc part 21. An ideal break point 54 is provided axially between the two snap-fit noses 52, 53 and is dimensioned so that it fixes both flywheel disc parts 1, 21 during transport and assembly and is completely separated during the initial start-up of the internal combustion engine as a result of the mass inertia moments which are present. The two individual parts 52, 53 of the transport retaining lock 49 remain in the openings 50,51.

FIG. 4*a* shows a partial section and FIG. 4*b* a partial view of the bearing flange 24 and the primary flywheel disc part 1 as well as their riveting together. A nipple 55 has been indented out from the primary flywheel disc part 1 by means of an axial pressing process by pressing in a ram and forming a shaped area 56 on the axially opposite side of the flywheel disc part whereby the nipple engages through the opening 57 in the bearing flange 24. Three circumferentially spread out noses 58 extend radially inwards into the opening 57 and adjoin the nipple 55 radially inwards. The alignment of the noses 58 takes place so that a clearance 59 comes to be formed radially in the direction of the shoulder 30 by means of which the bearing flange 24 is centred on the crankshaft (not shown). During the riveting process the nipple 55 is now pressed axially against the noses 58 so that a riveted bead 60 of the material of the nipples 55 flows over the noses 58 whereby the riveting becomes effective. The contact pressure is spread to the noses 58 so that the clearances 59 remain substantially pressure-free during riveting and no material compression which could change the centring surface 30*a* has a damaging effect so that subsequent calibration of the centring surface 30*a* can be omitted.

FIGS. 5*a–e* illustrate in more detail the manufacture and design of the ignition marking ring 46 (FIG. 3). In a first manufacturing step a metal ring is folded once round 180° and a radially aligned ledge 248 is formed so that two rings 249, 250 come to lie radially one above the other and the radially outer ring 249 is adjoined by the radially outwardly aligned ledge 248. A blank component 246 of this kind—shown in cross-section in FIG. 5*d*—is placed in a lower die 200 (partial section) and fixed with an upper die 201 (partial section). A ram 202 breaks out the ignition marking structure 48 over the entire circumference with the pressing force F in one workstep.

Figure 5A:
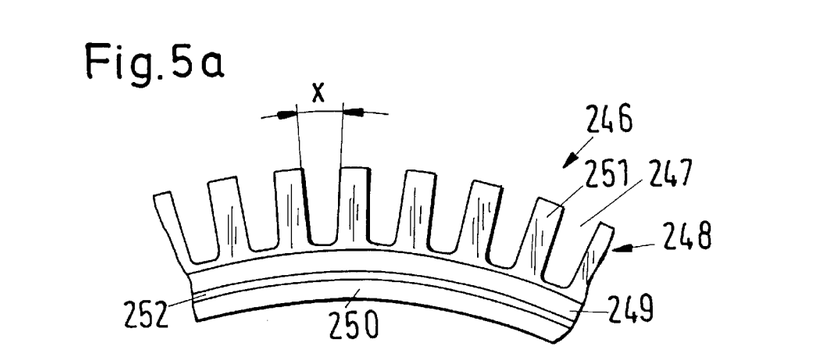
FIGS. 5a–e show the manufacture and design of an ignition marking ring.

A blank component 246 according to this manufacturing step is shown in FIG. 5*a* as a partial section. On the inner circumference can be seen the ring 250 mounted radially inside the folded edge 252 and the ring 249 mounted radially outside of the folded edge 252, on which the ledge 248 is formed radially at an angle of approximately 90° from which in the work step of FIG. 5*d* the ignition markings are struck in the form of teeth 251 and gaps 247. The shape of the gaps 247 with the outer spacing x is designed so that the spacing x decreases radially inwards so that when bending round the edges of the teeth the teeth 251 become parallel and the spacing is the same over the course of the teeth 251.

Figure 5B:
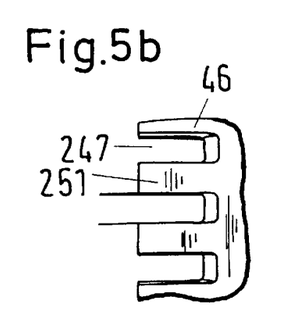
Figure 5C:
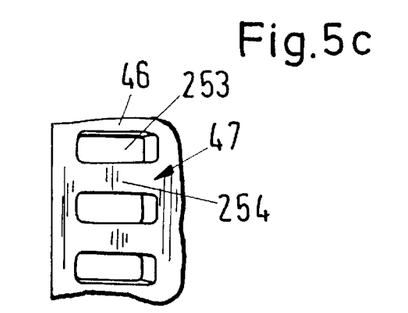
Figure 5D:
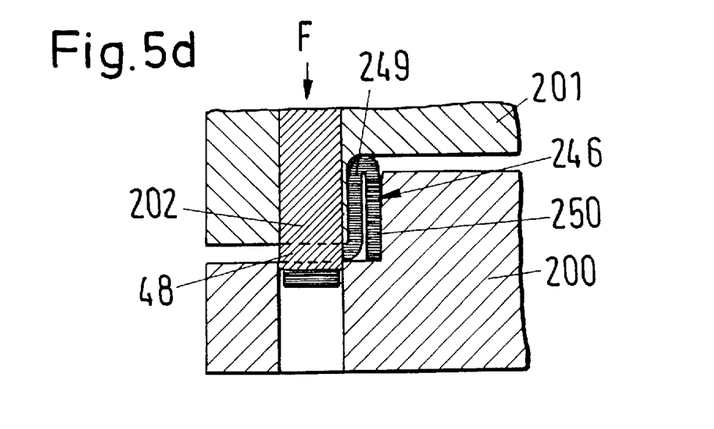
Figure 5E:
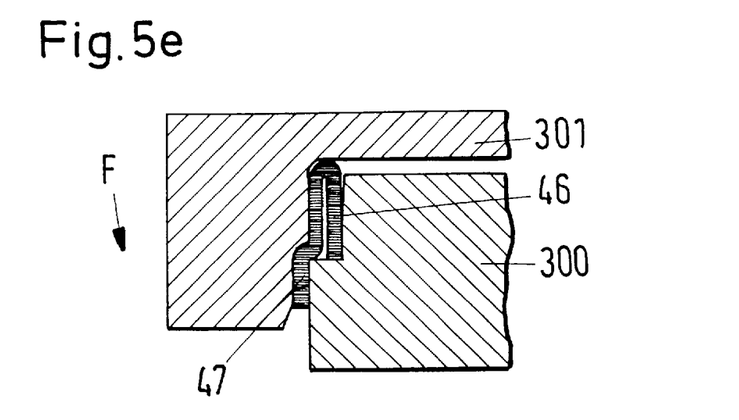

FIG. 5*e* shows the corresponding production step in the final stage. The blank component 246 shown in FIG. 5*a* was previously inserted in a die 300 (partial section) with radially protruding teeth 251. The re-shaping ram 301 guided in the axial direction with the pressing force F turns the edges of the teeth round in the axial direction so that the ignition marking ring 46 is formed with the axially extending ignition markings 47.

FIG. 5*b* shows a section of an embodiment of ignition markings with a comb structure of gaps and teeth. FIG. 5*c* shows an embodiment of an ignition marking ring 46 in partial view with circumferentially spaced windows 253 and webs 254 set in between as ignition markings 47. The manufacture takes place in a similar way to the sample embodiment of FIG. 5*a*.

Figure 6:
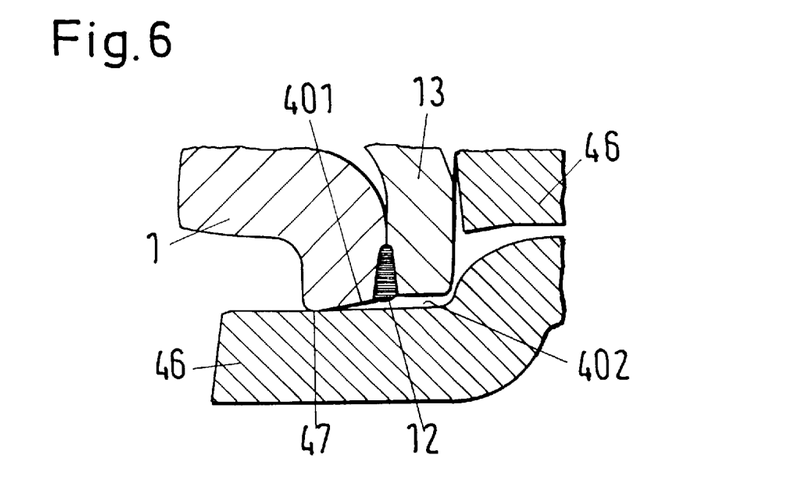
FIG. 6 shows a detail from FIG. 3 relating to a centred outer diameter with raised punched aperture.

FIG. 6 shows a detail from FIG. 3 relating to the one-piece component 1 having the centred stamped diameter 47 on which the ignition marking ring 46 is centred, and the raised circumferential punched aperture 401. Through the raised punched aperture 401 a radial gap is formed radially inside the ignition marking ring 46 to the component part 1 and the flange part 13 which are connected together axially adjacent by means of the welded seam 12, with the gap housing the welded seam 12 so that this can remain without affecting the centring and the component part 1 does not have to be calibrated afterwards to the centring diameter 47.

The patent claims filed with the application are proposed wordings without prejudice for obtaining wider patent protection. The applicant retains the right to claim further features disclosed up until now only in the description and/or drawings.

References used in the sub-claims refer to further designs of the subject of the main claim through the features of each relevant sub-claim; they are not to be regarded as dispensing with obtaining an independent subject protection for the features of the sub-claims referred to.

The subjects of these sub-claims however also form independent inventions which have a design independent of the subjects of the preceding claims.

The invention is also not restricted to the embodiments of the description. Rather numerous amendments and modifications are possible within the scope of the invention, particularly those variations, elements and combinations and/or materials which are inventive for example through combination or modification of individual features or elements or process steps contained in the drawings and described in connection with the general description and embodiments and claims and which through combinable features lead to a new subject or to new process steps or sequence of process steps insofar as these refer to manufacturing, test and work processes.

What is claimed is:

1. A divided flywheel for a motor having at least a primary part having a first flywheel mass, a secondary part having a second flywheel mass and at least a damping device acting circumferentially in the force flow between the two parts, the divided flywheel comprising a one-piece, disc-shaped component which:
   a) at an outer circumference of the disc-shaped component, has at least one first axially oriented mounting surface for a first ring-shaped component which is to be attached later in a centered position;
   b) at an axial distance from the first axially oriented mounting surface, has a second axially oriented mounting surface for a second ring-shaped component;
   c) has a radially formed shoulder within a region comprising the second axially oriented mounting surface, the radially formed shoulder being formed from a material thickening which is shaped when shaping the second axially oriented mounting surface, wherein the first axially oriented mounting surface is provided for mounting a ring-shaped component with ignition markings.

2. The divided flywheel according to claim 1, wherein the at least one first axially oriented mounting surface is a circumferential ring surface.

3. The divided flywheel according to claim 1, wherein the radially designed shoulder is substantially circumferential.

4. The divided flywheel according to claim 1, wherein the at least one first axially oriented mounting surface is provided for mounting one of a flywheel mass and a bearing.

5. The divided flywheel according to claim 1, wherein the first ring-shaped component is welded, caulked or shrink-fitted onto the first axially-oriented mounting surface.

6. The divided flywheel of claim 1, wherein the axial width of the at least one first axially oriented mounting surface is at least half the axial width of the first ring-shaped component.

7. The divided flywheel of claim 1, wherein the first ring-shaped component is fixed by press-fit onto the at least one first axially oriented mounting surface of the one-piece component.

8. The divided flywheel of claim 1, wherein the one-piece component is a drive plate which is elastic in the axial direction and rigid in the circumferential direction.

9. The divided flywheel of claim 1, wherein the one-piece component is a flywheel mass.

10. The divided flywheel of claim 1, wherein the primary part can be rotated selectively against the at least one secondary part which can be connected to engage and disengage with a gearbox input shaft, against the action of the damping device which acts at least in the circumferential direction in the force flow between the primary and secondary parts.

11. The divided flywheel according to claim 1, wherein the one-piece component is a bearing flange mounted on a crankshaft and holding the primary part.

12. The divided flywheel according to claim 11 wherein the bearing flange is riveted to the primary flywheel mass part.

13. A divided flywheel for a motor having at least a primary part having a first flywheel mass, a secondary part having a second flywheel mass and at least a damping device acting circumferentially in the force flow between the two parts, the divided flywheel comprising a one-piece, disc-shaped component which:
   a) at an outer circumference of the disc-shaped component, has at least one first axially oriented mounting surface for a first ring-shaped component which is to be attached later in a centered position;
   b) at an axial distance from the first axially oriented mounting surface, has a second axially oriented mounting surface for a second ring-shaped component;
   c) has a radially formed shoulder within a region comprising the second axially oriented mounting surface, the radially formed shoulder being formed from a material thickening which is shaped when shaping the second axially oriented mounting surface, wherein the one-piece component is connected to a bearing flange mounted on the crankshaft and holding the primary mass part, wherein the bearing flange is riveted to the primary flywheel mass part by means of at least one nipple which is axially formed in the primary flywheel mass part and engages through at least one corresponding opening provided in the bearing flange, whereby the at least one nipple is biased with pressure at its end engaging through the bearing flange and is pressed together with the edge of the at least one opening.

14. The divided flywheel according to claim 13 wherein the at least one opening in the bearing flange has at least three noses which are aligned radially inwards evenly over the inner circumference of the at least one opening and form the edge with which the at least one nipple is riveted.

15. The divided flywheel according to claim 14 wherein the alignment of the noses is such that none of the noses is mounted on an imaginary line between each centre of the at least one opening and the axis of rotation of the bearing flange.

16. A divided flywheel for a motor having at least a primary part having a first flywheel mass, a secondary part having a second flywheel mass and at least a damping device acting circumferentially in the force flow between the two parts, the divided flywheel comprising a one-piece, disc-shaped component which:
   a) at an outer circumference of the disc-shaped component, has at least one first axially oriented mounting surface for a first ring-shaped component which is to be attached later in a centered position;
   b) at an axial distance from the first axially oriented mounting surface, has a second axially oriented mounting surface for a second ring-shaped component;
   c) has a radially formed shoulder within a region comprising the second axially oriented mounting surface, the radially formed shoulder being formed from a material thickening which is shaped when shaping the second axially oriented mounting surface, wherein at least one transport retaining lock is provided axially between the primary flywheel disc part and the secondary flywheel disc part prior to the initial operation.

17. The divided flywheel according to claim 16 wherein the transport retaining lock is provided radially between energy accumulators belonging to the damping device and arranged over the circumference, and a mounting of the primary flywheel disc art on the crankshaft.

18. The divided flywheel according to claim 16 wherein the transport retaining lock consists of a plastics part which is snap-fitted in corresponding recessed window-shaped openings of the primary and secondary flywheel disc parts and has an ideal break point axially between the primary and secondary flywheel disc parts.

19. The dividend flywheel according to claim 18 wherein the plastics part is snap fitted into a corresponding opening of the radially aligned flange part connected rotationally secured to the secondary flywheel disc part for biasing the energy accumulators.

20. The divided flywheel according to claim 18 wherein the ideal break point is dimensioned so that it is separated right through during the first start-up of the internal combustion engine.

21. A divided flywheel for a motor having at least a primary part having a first flywheel mass, a secondary part having a second flywheel mass and at least a damping device acting circumferentially in the force flow between the two parts, the divided flywheel comprising a one-piece, disc-shaped component which:
   a) at an outer circumference of the disc-shaped component, has at least one first axially oriented mounting surface for a first ring-shaped component which is to be attached later in a centered position;
   b) at an axial distance from the first axially oriented mounting surface, has a second axially oriented mounting surface for a second ring-shaped component;
   c) has a radially formed shoulder within a region comprising the second axially oriented mounting surface, the radially formed shoulder being formed from a material thickening which is shaped when shaping the second axially oriented mounting surface, wherein at least one radially inwardly open chamber adapted in the circumferential direction to the extension of the energy accumulators is provided on the outer circumference of the primary flywheel disc part out from the one-piece component whereby the flange part connected rotationally secured to the secondary flywheel disc part for biasing the energy accumulators engages through the chamber from radially inwards, whereby the chamber holds the energy accumulators and is filled at least in part with lubricant for lubricating same.

22. A divided flywheel for a motor having at least a primary part having a first flywheel mass, a secondary part having a second flywheel mass and at least a damping device acting circumferentially in the force flow between the two parts, the divided flywheel comprising a one-piece, disc-shaped component which:
   a) at an outer circumference of the disc-shaped component, has at least one first axially oriented mounting surface for a first ring-shaped component which is to be attached later in a centered position;
   b) at an axial distance from the first axially oriented mounting surface, has a second axially oriented mounting surface for a second ring-shaped component;
   c) has a radially formed shoulder within a region comprising the second axially oriented mounting surface, the radially formed shoulder being formed from a material thickening which is shaped when shaping the second axially oriented mounting surface, wherein the damping device is arranged in a circumferentially extending chamber and the primary part comprises apertures that are spread out over a circumference, are punched radially inside the chamber, and have raised punched break-throughs.

23. A divided flywheel for a motor having at least a primary part having a first flywheel mass, a secondary part having a second flywheel mass and at least a damping device acting circumferentially in the force flow between the two parts, the divided flywheel comprising a one-piece, disc-shaped component which:
   a) at an outer circumference of the disc-shaped component, has at least one first axially oriented mounting surface for a first ring-shaped component which is to be attached later in a centered position;
   b) at an axial distance from the first axially oriented mounting surface, has a second axially oriented mounting surface for a second ring-shaped component;
   c) has a radially formed shoulder within a region comprising the second axially oriented mounting surface, the radially formed shoulder being formed from a material thickening which is shaped when shaping the second axially oriented mounting surface, wherein the outer circumference of the primary disc part is punched on a centering diameter on which the first ring shaped component is mounted in a centered position.

24. The divided flywheel of claim 23, wherein the punctured aperture of the centering diameter is raised.

25. The divided flywheel according to claim 1, wherein the second axially oriented mounting surface is provided for mounting a starter ring gear.

26. A divided flywheel for a motor having at least a primary part having a first flywheel mass, a secondary part having a second flywheel mass and at least a damping device acting circumferentially in the force flow between the two parts, the divided flywheel comprising a one-piece, disc-shaped component which:
   a) at an outer circumference of the disc-shaped component, has at least one first axially oriented mounting surface for a first ring-shaped component which is to be attached later in a centered position;
   b) at an axial distance from the first axially oriented mounting surface, has a second axially oriented mounting surface for a second ring-shaped component;
   c) has a radially formed shoulder within a region comprising the second axially oriented mounting surface, the radially formed shoulder being formed from a material thickening which is shaped when shaping the second axially oriented mounting surface, wherein at least one radially inwardly open chamber adapted in the circumferential direction to the extension of the energy accumulators is provided on the outer circumference of the primary flywheel disc part connected to the one-piece component whereby the flange part connected rotationally secured to the secondary flywheel disc part for biasing the energy accumulators engages through the chamber from radially inwards, whereby the chamber holds the energy accumulators and is filled at least in part with lubricant for lubricating same.

27. The divided flywheel according to claim 1, wherein the one-piece component is connected to form a single piece with a bearing flange mounted on the crankshaft and holding the primary mass part.

28. The divided flywheel according to claim 22, wherein the punched apertures are provided for at least one of the purposes of facilitating an assembly step of the divided flywheel, ventilating the divided flywheel, and collecting liquefied lubricant.

29. The divided flywheel according to claim 23, wherein the first ring shaped component comprises a ring with ignition markings.

30. The divided flywheel according to claim 29, wherein the ignition marking ring is folded at least once in the radial direction by means of a cold forming technique and ignition markings are provided in a comb or window structure on the outer circumference of an axially aligned ring face.

* * * * *